No. 871,729. PATENTED NOV. 19, 1907.
W. C. McCHORD, Jr.
ELECTRIC FAN.
APPLICATION FILED JUNE 14, 1906.
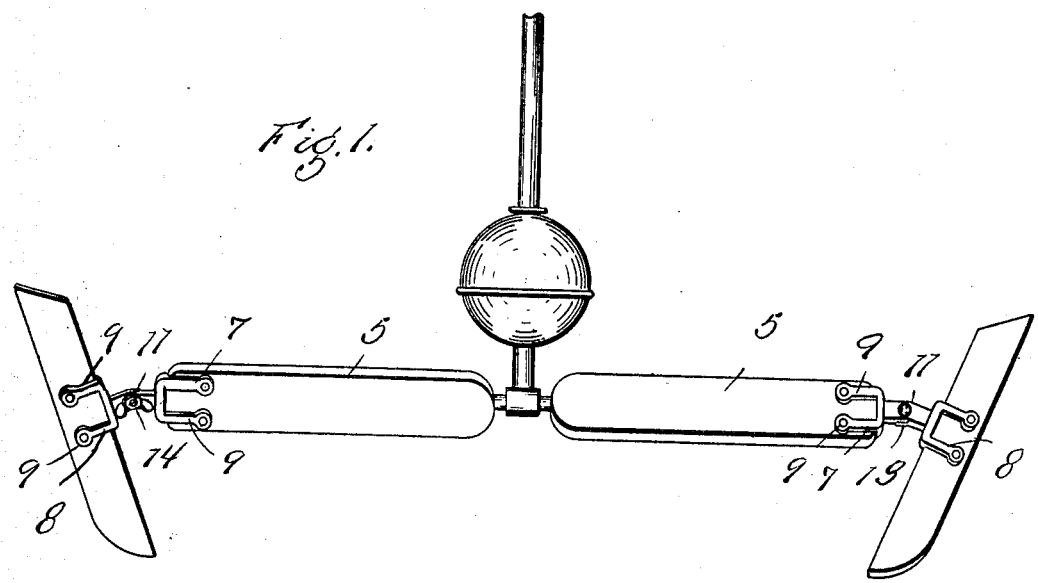
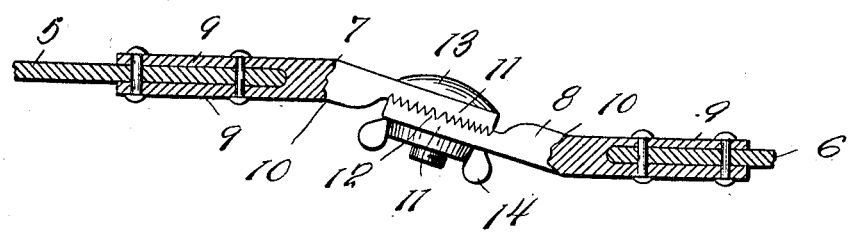
Witnesses
G. R. Thomas
F. B. MacNab
Inventor
W. C. McChord Jr
By Chandler & Chandler
Attorneys

UNITED STATES PATENT OFFICE.

WILLIAM C. McCHORD, JR., OF SPRINGFIELD, KENTUCKY.

ELECTRIC FAN.

No. 871,729.

Specification of Letters Patent.

Patented Nov. 19, 1907.

Application filed June 14, 1906. Serial No. 321,688.

*To all whom it may concern:*

Be it known that I, WILLIAM C. McCHORD, Jr., a citizen of the United States, residing at Springfield, in the county of Washington, State of Kentucky, have invented certain new and useful Improvements in Electric Fans; and I do hereby declare the following to be a full, clear, and exact description of the invention, such as will enable others skilled in the art to which it appertains to make and use the same.

This invention relates to attachments for electric ceiling-fans and has for its primary object to provide a supplemental blade for fans of this nature which may be attached to the main blades to give a greater current of air. The invention includes means for attaching the supplemental blade to the main blade at various angles to obtain a current of air in any desired direction.

In the accompanying drawings: Figure 1 is an elevation of an ordinary electric ceiling-fan and showing my invention applied to the blades thereof. Fig. 2 is a sectional view through the adjusting means for the blades.

Referring to the drawings, 5 denotes the fan blades of a ceiling fan of the ordinary construction, and 6 supplemental blades which are attached to the main blades 5 of the fan. The blades are connected by means of brackets, each comprising a pair of members 7 and 8. Each of the members comprises a stem having at one of its ends spaced pairs of attaching arms 9, the corresponding arms of each pair being designed to lie upon the same side of the blades to which they are attached. The stems of the bracket members are bent at an obtuse angle adjacent their middle as at 10 and have their ends opposite to the attaching arms 9 flattened to form heads 11. On the meeting faces of each of the heads 11 is formed a plurality of radial ribs 12 and engaged through registering openings in the said heads is a headed bolt 13 which is threaded to receive a thumb nut 14.

From the above it will be seen that the supplemental blades 6 may be fixedly disposed at various angles with respect to the main blades 5 to obtain currents of air in different directions.

What is claimed is:

1. The combination with a main fan blade, of a supplemental fan blade arranged for attachment to the main fan blade.

2. The combination with a main fan blade, of a supplemental fan blade arranged for adjustable connection with the main fan blade.

3. The combination with a main fan blade, of a supplemental fan blade arranged for attachment to the main fan blade at various angles.

4. The combination with a main fan blade, of a supplemental blade, and a bracket detachably connecting the said blades.

5. The combination with a main fan blade, of a supplemental blade, and a bracket adjustably connecting the said blades.

6. The combination with a main fan blade, of a supplemental blade, and a bracket detachably and adjustably connecting the said blades.

In testimony whereof, I affix my signature, in presence of two witnesses.

WILLIAM C. McCHORD, JR.

Witnesses:
JAS. J. GRAVES,
T. J. CONWAY.